United States Patent
Oh et al.

(10) Patent No.: US 7,206,485 B2
(45) Date of Patent: Apr. 17, 2007

(54) PHOTONIC CRYSTAL FIBER PREFORM AND PHOTONIC CRYSTAL FIBER MANUFACTURED USING THE SAME

(75) Inventors: Sung-Koog Oh, Kumi (KR); Jae-Ho Lee, Kumi (KR)

(73) Assignee: Samsung Electronics Co., Ltd., Suwon-Si, Gyeonggi-Do (KR)

(*) Notice: Subject to any disclaimer, the term of this patent is extended or adjusted under 35 U.S.C. 154(b) by 0 days.

(21) Appl. No.: 10/754,027

(22) Filed: Jan. 8, 2004

(65) Prior Publication Data
US 2004/0240816 A1 Dec. 2, 2004

(30) Foreign Application Priority Data
May 29, 2003 (KR) .............. 10-2003-0034387

(51) Int. Cl.
*G02B 6/02* (2006.01)
*G02B 6/00* (2006.01)

(52) U.S. Cl. ..................... 385/123; 385/126
(58) Field of Classification Search ......... 385/123–128
See application file for complete search history.

(56) References Cited

U.S. PATENT DOCUMENTS

| 6,445,862 B1 * | 9/2002 | Fajardo et al. ............ 385/125 |
| 6,598,428 B1 * | 7/2003 | Cryan et al. ............... 65/409 |
| 6,661,954 B2 * | 12/2003 | Sasaoka et al. ............ 385/39 |
| 6,718,105 B2 * | 4/2004 | Hasegawa et al. .......... 385/123 |
| 2002/0061176 A1 * | 5/2002 | Libori et al. .............. 385/125 |
| 2002/0122644 A1 | 9/2002 | Birks et al. ............... 385/125 |
| 2002/0181911 A1 | 12/2002 | Wadsworth et al. ......... 385/125 |
| 2004/0136671 A1 * | 7/2004 | Nakahara .................. 385/125 |
| 2004/0179796 A1 * | 9/2004 | Jakobsen et al. .......... 385/123 |
| 2005/0018986 A1 * | 1/2005 | Argyros et al. ........... 385/125 |
| 2005/0069269 A1 * | 3/2005 | Libori et al. ............. 385/125 |

FOREIGN PATENT DOCUMENTS

| EP | 1128195 A2 | 8/2001 |
| EP | 1199581 A1 | 4/2002 |
| EP | 1231807 A2 | 8/2002 |
| EP | 1233290 A2 | 8/2002 |
| EP | 1248417 A2 | 10/2002 |
| WO | WO 01/42829 A2 | 6/2001 |
| WO | WO 02/063781 | 8/2002 |
| WO | WO2004/046777 | 6/2004 |

* cited by examiner

*Primary Examiner*—Sung Pak
(74) *Attorney, Agent, or Firm*—Cha & Reiter, L.L.C.

(57) ABSTRACT

A photonic crystal fiber (PCF) preform, from which a photonic crystal fiber is manufactured, includes a rod-shaped substrate with holes longitudinally formed therethrough in a photonic lattice structure, and material layers having at least two different indices of refraction. The material layers are disposed in the holes, respectively. Distribution of index of refraction of the photonic crystal fiber preform is controlled by arrangement of the material layers. Consequently, an optical fiber with very low optical loss, very low optical nonlinearity and excellent transmission characteristics can be easily manufactured, and an optical fiber with various characteristics, differing depending upon the lattice structure, can be realized.

18 Claims, 5 Drawing Sheets

PHOTONIC CRYSTAL FIBER PREFORM AND PHOTONIC CRYSTAL FIBER MANUFACTURED USING THE SAME

CLAIM OF PRIORITY

This application claims priority to an application entitled "PHOTONIC CRYSTAL FIBER PREFORM AND PHOTONIC CRYSTAL FIBER MANUFACTURED USING THE SAME," filed in the Korean Intellectual Property Office on May 29, 2003 and assigned Ser. No. 2003-34387, the contents of which are hereby incorporated by reference.

BACKGROUND OF THE INVENTION

1. Field of the Invention

The present invention relates to a photonic crystal fiber (PCF) preform and a photonic crystal fiber manufactured using the same.

2. Description of the Related Art

A photonic crystal fiber (PCF) is a special kind of optic fiber. A general single-mode optical fiber is made up of a core material which consists of glass and germanium or phosphorus. On the other hand, the photonic crystal fiber is made up of a single, solid and substantially transparent material 1, such as silica glass, and periodically spaced air holes 2 running along the fiber, as shown in FIG. 1. Difference in dielectric constant between the silica glass material 1 and the periodically spaced air holes 2 forms a photonic band gap, which serves to prevent movement of a ray in a specific direction as in an electronic band gap of a semiconductor. In other words, the ray passes through the photonic band gap only when the ray satisfies conditions under which it may pass through.

The photonic crystal fiber has many important technical properties. For example, the photonic crystal fiber may support a single mode over a wide range of wavelengths, and may provide a large mode region. Consequently, the photonic crystal fiber is capable of transmitting high optical power and providing large phase dispersion in a telecommunication wavelength of 1.55 μm. Furthermore, the photonic crystal fiber is increasingly used as a device for controlling nonlinearity or polarization. It is expected based on recent reports on these functions of photonic crystal fiber, that photonic crystal fiber will be widely applied to optical communication and optical-related industries in the near future.

A photonic crystal fiber must originate from a photonic crystal fiber perform, which is drawn into a photonic crystal fiber having an efficiently long length and retaining its Generally, the photonic crystal fiber preform may have structures schematically shown in FIGS. 2a and 2b.

The photonic crystal fiber preform of FIG. 2a is made up of a circular silica glass rod 10 and a plurality of circular air holes 11 longitudinally formed through the circular silica glass rod 10 in a photonic lattice structure. Index of refraction of the photonic crystal fiber preform with the above-stated construction is distributed as illustrated in FIG. 2b.

The conventional photonic lattice structures, however, limit photonic crystal fiber preform design. Furthermore, the air holes may be deformed when being drawn into desired photonic crystal fibers. The photonic crystal fibers are, as a result, not manufactured according to the originally intended design. Also, the material constituting a core of the photonic crystal fiber is limited as to its properties.

SUMMARY OF THE INVENTION

The present invention, which has been made in view of the above problems, provides, in one aspect, a photonic crystal fiber preform which is easily manufactured and makes it easy to realize design of optical fibers, and a photonic crystal fiber manufactured using the same.

In another aspect, the present invention is directed to a photonic crystal fiber preform which is capable of providing a single mode over a wide range of wavelengths and improving its transmission mode and its loss characteristics by simple design of a lattice structure thereof, and a photonic crystal fiber manufactured using the same.

In a further aspect, the present invention is realized as a photonic crystal fiber preform that includes a rod-shaped substrate with a plurality of holes longitudinally formed therethrough in a photonic lattice structure; and a plurality of longitudinal material members or material "layers" having at least two different indices of refraction. The material layers are disposed in the holes, wherein distribution of index of refraction of the photonic crystal fiber preform is controlled by arrangement of the material layers.

Each of the material layers is preferably formed in the shape of a rod, and the rod is inserted in the corresponding hole.

More preferably, the index of refraction of the material layers gradually decreases monotonically from the center of the preform to the outer circumference of the preform.

In accordance with an additional aspect of the present invention, a photonic crystal fiber preform includes a cylindrical substrate; and a plurality of material layers having at least two different indices of refraction The material layers are disposed in the cylindrical substrate in a photonic lattice structure. Distribution of index of refraction of the photonic crystal fiber preform is controlled by arrangement of the material layers.

Preferably, each of the material layers is formed in the shape of a cylinder having a diameter smaller than that of the cylindrical substrate.

In a still further aspect of the present invention, a photonic crystal fiber preform includes an outer cylindrical substrate with first holes longitudinally formed there through, and an inner rod-shaped substrate fitted in the outer cylindrical substrate. The inner rod-shaped substrate has second holes longitudinally formed therethrough, the first and second holes being arranged in a photonic lattice structure The perform also features material layers having at least two different indices of refraction, the material layers being disposed in the first and second holes. Distribution of index of refraction of the photonic crystal fiber preform is controlled by arrangement of the material layers.

In yet another aspect of the present invention, a photonic crystal fiber comprises a rod-shaped substrate with holes longitudinally formed therethrough in a photonic lattice structure; and material layers having at least two different indices of refraction. The material layers fill in the holes, respectively. Distribution of index of refraction of the photonic crystal fiber is determined by arrangement of the material layers.

BRIEF DESCRIPTION OF THE DRAWINGS

The above features and other advantages of the present invention will be more clearly understood from the following detailed description taken in conjunction with the accompanying drawings, in which the reference numbers of same or similar features are retained identically throughout the several views:

FIG. 2a is a cross-sectional view of a conventional photonic crystal fiber preform, and FIG. 2b is a graph illustrating distribution of index of refraction of the conventional photonic crystal fiber preform of FIG. 2a;

DETAILED DESCRIPTION OF THE PREFERRED EMBODIMENTS

Preferred embodiments of the present invention will be described in detail with reference to the annexed drawings. In the following, detailed description of known functions and configurations is omitted for clarity and simplicity.

Figure 1:
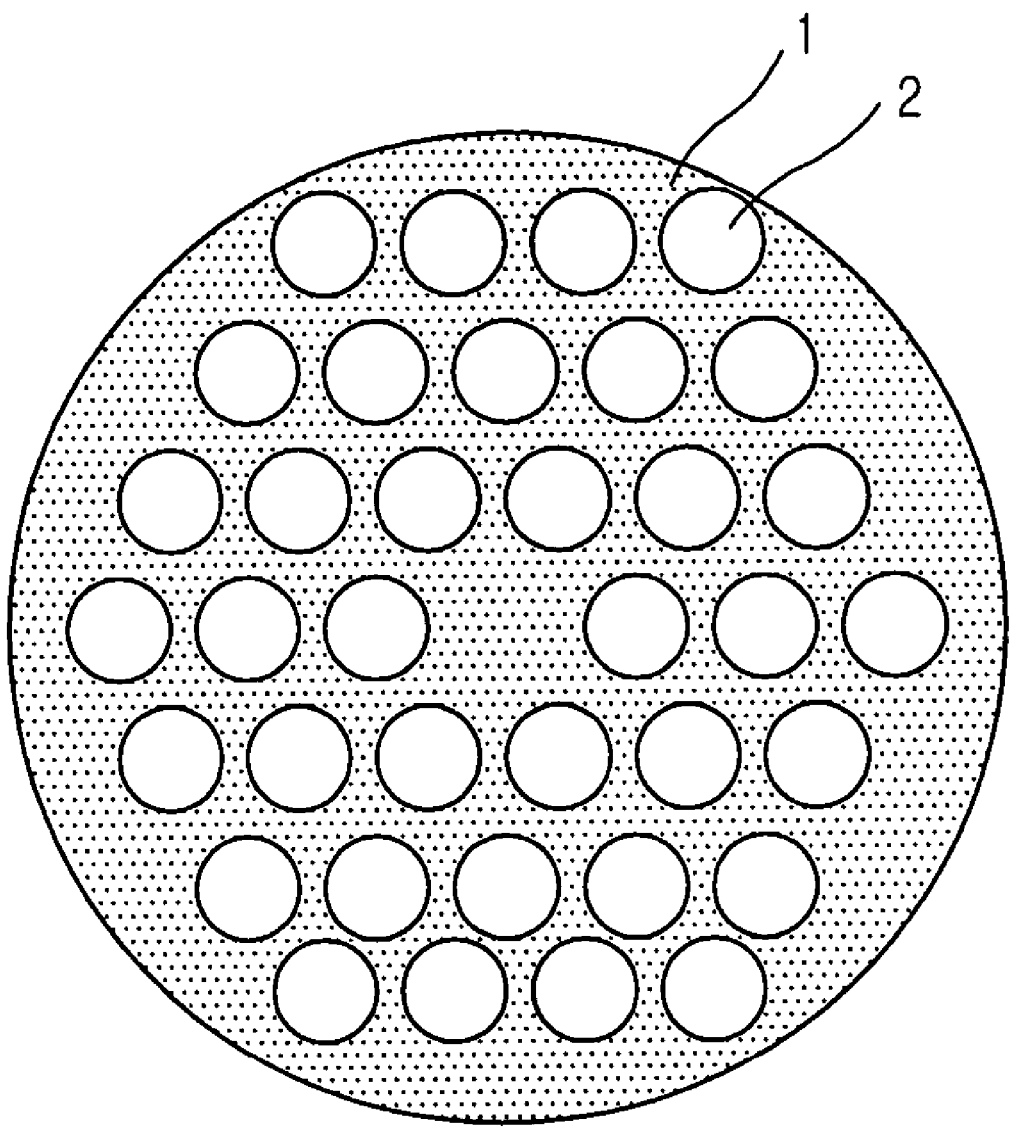
FIG. 1 is a schematic cross-sectional view of a general photonic crystal fiber.
Figure 2:
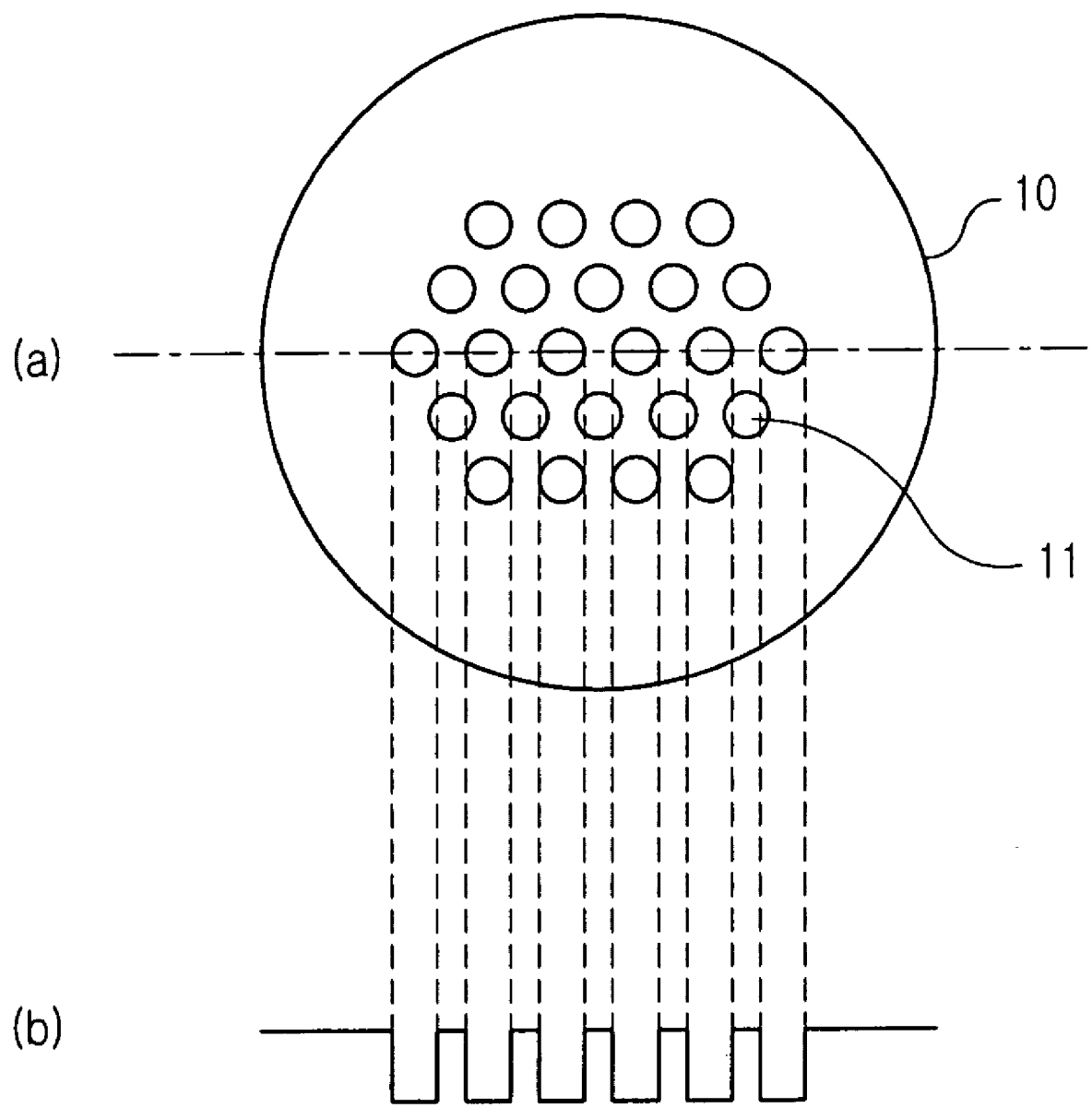
Figure 3:
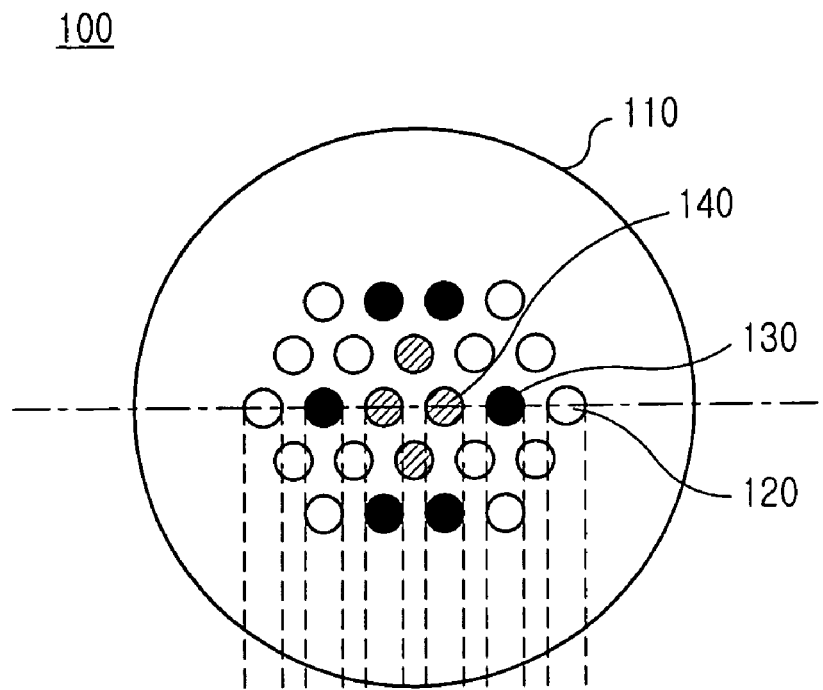
FIG. 3 is a cross-sectional view of a photonic crystal fiber preform according to a first preferred embodiment of the present invention.

FIG. 3 depicts, by way of illustrative and non-limitative example, in cross section a photonic crystal fiber preform 100 according to a first preferred embodiment of the present invention.

The photonic crystal fiber preform 100 is made up of a rod-shaped substrate 110 with a plurality of holes longitudinally formed therethrough in a photonic lattice structure. Each of the holes has a circular cross section, and the diameter of each of the holes is smaller than that of the rod-shaped substrate 110. The holes are uniformly spaced apart from each other to form a hexagonal pattern, and are filled with materials having at least two different indices of refraction 120, 130, 140, respectively. Distribution of index of refraction of the photonic crystal fiber preform 100 is determined by indices of refraction of the materials filled in the holes arranged in the photonic lattice structure.

In this embodiment of the present invention, the rod-shaped substrate 110 is made of pure silica, and the holes are filled with the materials 120, 130, 140 having, respectively, a relative index of refraction to pure silica of –1%, 0.3% and 1%.

Figure 4:
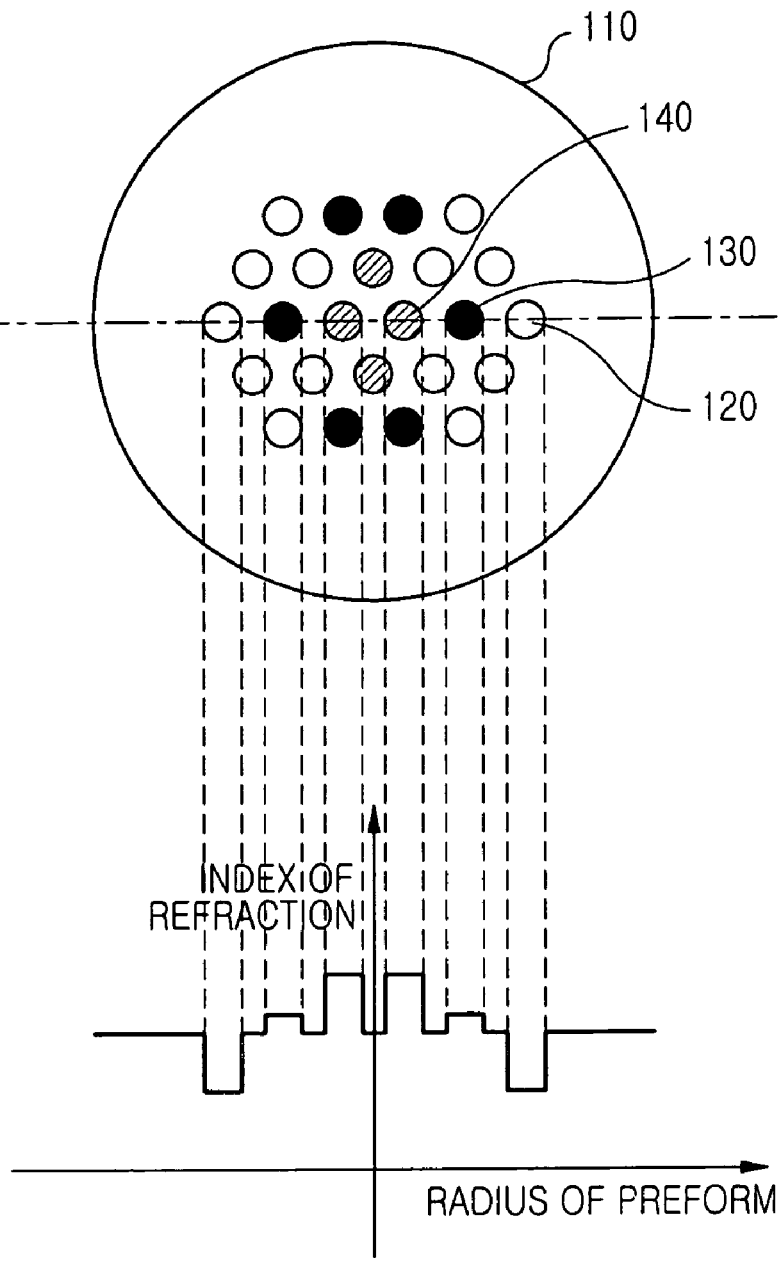
FIG. 4 is a graph illustrating distribution of index of refraction of the photonic crystal fiber preform along line A–A' of FIG. 3.

FIG. 4 illustrates an exemplary distribution of index of refraction of the photonic crystal fiber preform according to the first preferred embodiment of the present invention along line A–A' of FIG. 3. The horizontal axis of FIG. 4 indicates radius of the photonic crystal fiber preform, and the vertical axis of FIG. 4 indicates index of refraction of the photonic crystal fiber preform. When the longitudinal material members or material layers filled in the holes are arranged in such a manner that the index of refraction gradually decreases monotonically from the center of the photonic crystal fiber preform to the outer circumference of the photonic crystal fiber preform. Correspondingly, the index of refraction of the photonic crystal fiber preform also gradually decreases monotonically from the center of the photonic crystal fiber preform to the outer circumference of the photonic crystal fiber preform, as illustrated in FIG. 4. It should be noted, nevertheless, that the index of refraction of the photonic crystal fiber preform may, instead, gradually increase monotonically from the center of the photonic crystal fiber preform to the outer circumference of the photonic crystal fiber preform when the material layers filled in the holes are arranged in such a manner that the index of refraction gradually increases monotonically from the center of the photonic crystal fiber preform to the outer circumference of the photonic crystal fiber preform. It is possible, moreover, to control the index of refraction of the photonic crystal fiber preform in such a manner that the index of refraction of the photonic crystal fiber preform gradually increases monotonically and then decreases monotonically, and vice versa by arranging the material layers filled in the holes in such a manner that the index of refraction increases monotonically and then decreases monotonically, and vice versa.

Figure 5:
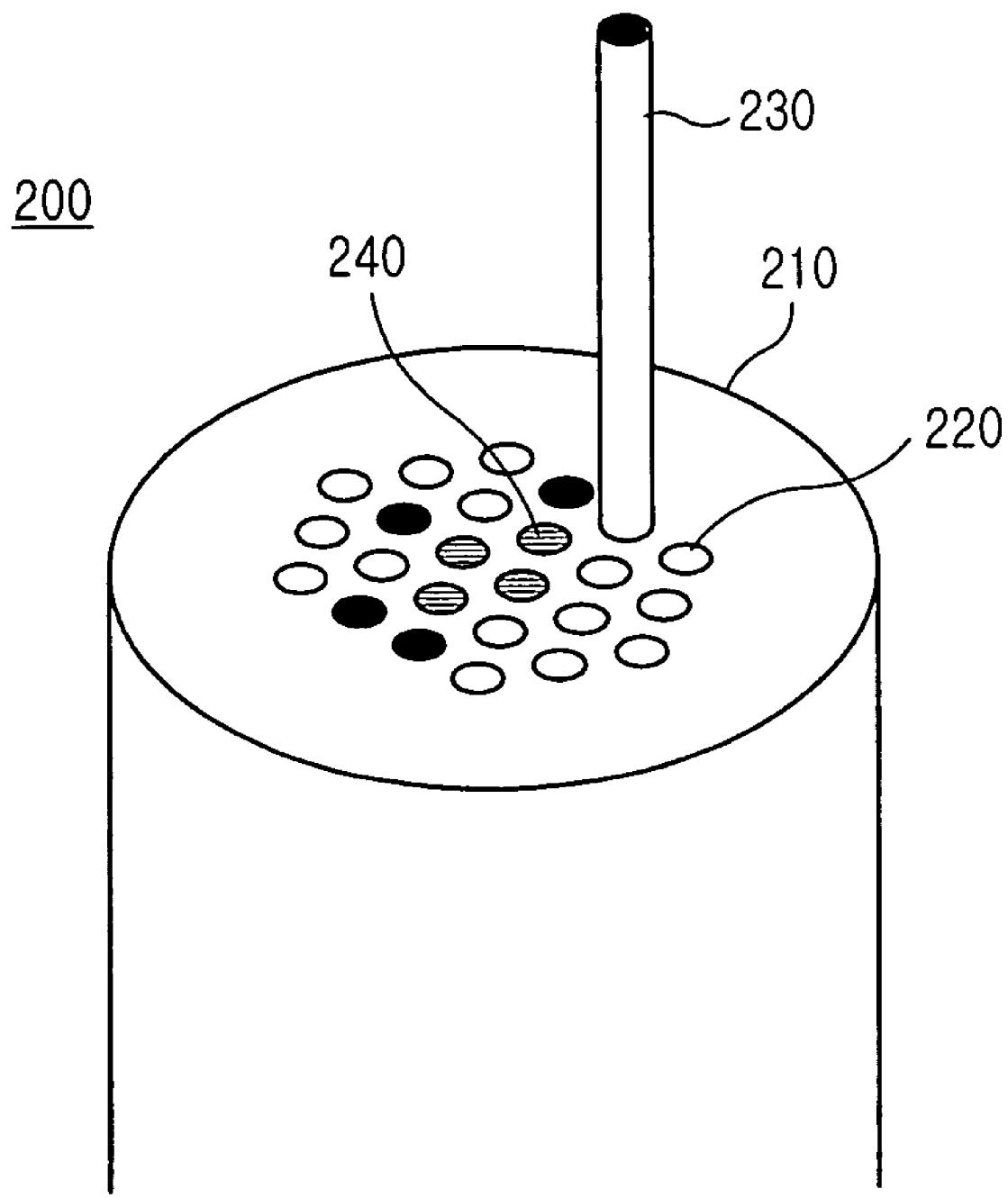
FIG. 5 is a perspective view of a photonic crystal fiber preform according to a second preferred embodiment of the present invention.

FIG. 5 is a perspective view of a photonic crystal fiber preform 200 according to a second preferred embodiment of the present invention. The photonic crystal fiber preform 200 comprises a rod-shaped substrate 210 with a plurality of holes longitudinally formed therethrough in a photonic lattice structure, and a plurality of rods 220, 230, 240 made of materials having at least two different indices of refraction, respectively. The rods 220, 230, 240 are inserted in the holes, respectively. Distribution of index of refraction of the photonic crystal fiber preform 200 is determined by the indices of refraction of the rods 220, 230, 240 inserted in the holes of the rod-shaped substrate 210.

Figures 6, 7:
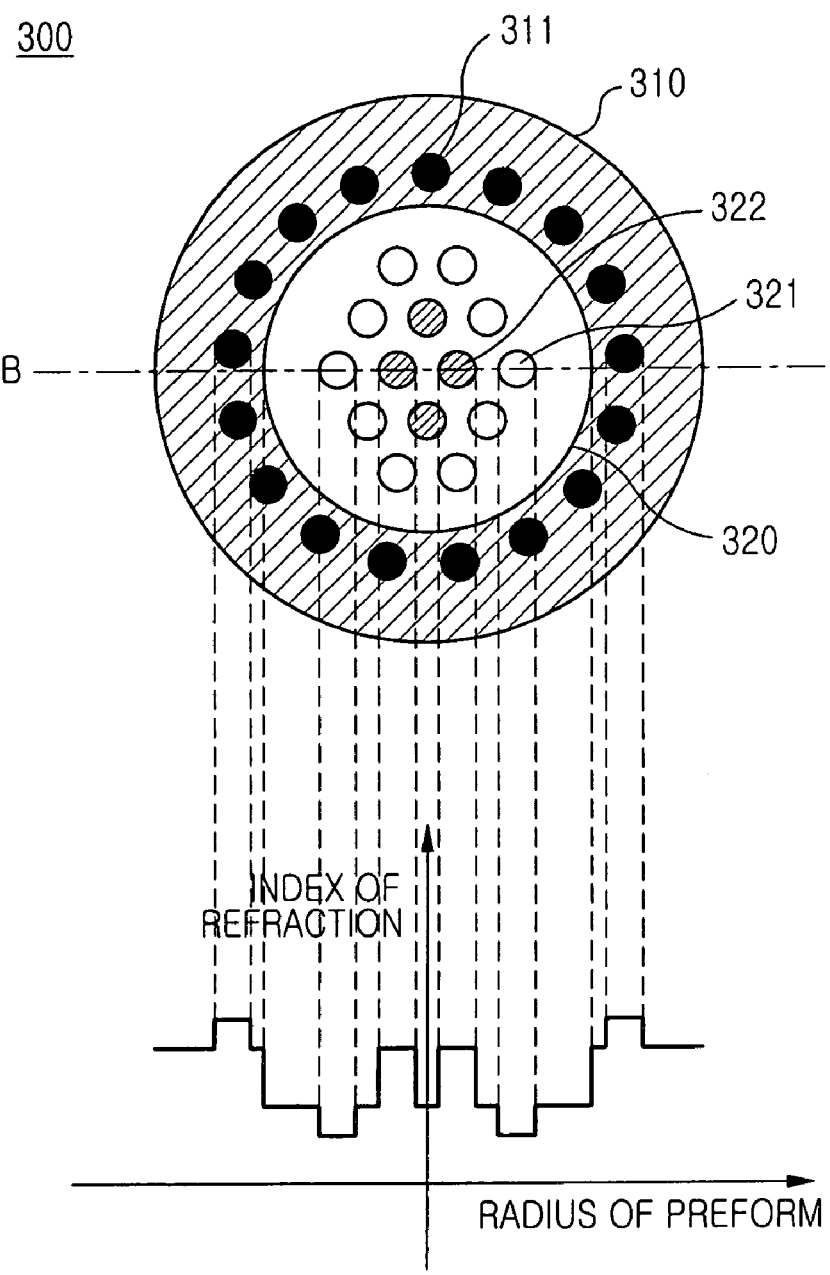
FIG. 6 is a cross-sectional view of a photonic crystal fiber preform according to a third preferred embodiment of the present invention.
FIG. 7 is a graph illustrating the distribution of index of refraction of the photonic crystal fiber preform along line B–B' of FIG. 6.

According to third preferred embodiment of the invention, a photonic crystal fiber preform 300, shown in cross sectional view in FIG. 6, is characterized by two substrates having different indices of refraction. Specifically, the photonic crystal fiber preform 300 includes an outer cylindrical substrate 310 having a desired percentage as its relative index of refraction to pure silica, and an inner rod-shaped substrate 320 fitted in the outer cylindrical substrate 310. The inner rod-shaped substrate 320 is made of pure silica.

The outer cylindrical substrate 310 has holes longitudinally formed there through, each of which has a circular cross section. Similarly, the holes in the inner rod-shaped substrate 320 each also has a circular cross section. Into the holes of both substrates 310, 320, the holes of both being arranged in a photonic lattice structure, are inserted rods 311, 321, 322 having at least two different indices of refraction or materials having at least two different indices of refraction, respectively. Distribution of index of refraction of the photonic crystal fiber preform 300 is determined by combination of the indices of refraction of the outer substrate 310 and the indices of refraction of the holes 311, 321, 322 formed in the outer and inner substrates 310, 320.

The outer cylindrical substrate 310 is made of a material having 0.5% as its relative index of refraction to pure silica, and the holes of the outer cylindrical substrate 310 are filled with the material 311 having 1.5% as its relative index of refraction to the pure silica. The inner rod-shaped substrate 320 is made of pure silica, and the holes of the inner rod-shaped substrate 320 are filled with the material 321 having –0.5% as its relative index of refraction to the pure silica and the material 322 having 1% as its relative index of refraction to the pure silica, respectively.

FIG. 7 illustrates the distribution of index of refraction of the photonic crystal fiber preform according to the third preferred embodiment of the present invention along line B–B' of FIG. 6. The horizontal axis of FIG. 7 indicates radius of the photonic crystal fiber preform, and the vertical axis of FIG. 7 indicates index of refraction of the photonic crystal fiber preform. As seen from FIG. 7, distribution of index of refraction of the photonic crystal fiber preform is determined by indices of refraction of the material layers filled in the holes formed in the inner and outer substrates.

Photonic crystal fibers manufactured from the photonic crystal fiber preforms with the above-stated constructions according to the first to third preferred embodiments of the present invention basically have the same structures as the corresponding photonic crystal fiber preforms. The process for drawing a photonic crystal fiber preform into a desired photonic crystal fiber is well known, and thus a description of this will be omitted.

As apparent from the above description, the present invention provides a photonic crystal fiber preform comprising a material layers having at least two different indices of refraction and arranged in a photonic lattice structure, wherein distribution of index of refraction of the photonic crystal fiber preform is controlled by arrangement of the material layers. The present invention also provides a photonic crystal fiber manufactured from the inventive photonic crystal fiber preform. Consequently, an optical fiber with very low optical loss, very low optical nonlinearity and excellent transmission characteristics can be easily manufactured, and an optical fiber with various characteristics, differing depending upon the lattice structure, can be realized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A photonic crystal fiber preform comprising:
    a rod-shaped substrate with a plurality of holes longitudinally formed therethrough in a photonic lattice structure; and
    a plurality of longitudinal material members consisting of solid material, said members having at least two different indices of refraction, the members being inserted in the holes,
    wherein distribution of index of refraction of the photonic crystal fiber preform is controlled by arrangement of the members, and said distribution of index of refraction of the photonic crystal fiber preform is changed by change of said arrangement of the members.

2. The preform as set forth in claim 1, wherein each of the members is formed in the shape of a rod, the rod being inserted in the corresponding hole.

3. The preform as set forth in claim 1, wherein each of the holes and members is formed in the shape of a cylinder, the member being inserted in the corresponding hole.

4. The preform as set forth in claim 1, wherein the index of refraction of the members monotonically decreases from the center of the preform to the outer circumference of the preform.

5. The preform as set forth in claim 1, wherein the index of refraction of the members monotonically increases from the center of the preform to the outer circumference of the preform.

6. The preform as set forth in claim 1, wherein the index of refraction of the members monotonically either decreases and then increases or increases and then decreases from the center of the preform to the outer circumference of the preform.

7. The preform as set forth in claim 1, wherein the substrate is made of a material containing pure silica.

8. The preform as set forth in claim 1, wherein the substrate is made of a material containing silica and a dopant having a predetermined index of refraction.

9. The preform as set forth in claim 7, wherein the relative index of refraction of each of the members to pure silica is a predetermined percentage.

10. A photonic crystal fiber preform comprising:
    a cylindrical substrate; and
    a plurality of longitudinal solid material members having at least two different indices of refraction, the members being disposed in the cylindrical substrate in a photonic lattice structure,
    wherein distribution of index of refraction of the photonic crystal fiber preform is controlled by arrangement of the members, and said distribution of index of refraction of the photonic crystal fiber preform is changed by change of said arrangement of the members.

11. The preform as set forth in claim 10, wherein each of the members is formed in the shape of a rod.

12. The preform as set forth in claim 10, wherein each of the members is formed in the shape of a cylinder having a diameter smaller than that of the cylindrical substrate.

13. The preform as set forth in claim 10, wherein the index of refraction of the members monotonically decreases from the center of the preform to the outer circumference of the preform.

14. The preform as set forth in claim 10, wherein the index of refraction of the members monotonically increases from the center of the preform to the outer circumference of the preform.

15. The preform as set forth in claim 10, wherein the index of refraction of the members monotonically either decreases and then increases or increases and then decreases from the center of the preform to the outer circumference of the preform.

16. A photonic crystal fiber preform comprising:
    an outer cylindrical substrate with a plurality of first holes longitudinally formed therethrough;
    an inner rod-shaped substrate fitted in the outer cylindrical substrate, the inner rod-shaped substrate having a plurality of second holes longitudinally formed therethrough, the first and second holes being arranged in a photonic lattice structure; and
    a plurality of longitudinal material members consisting of solid material, said members having at least two different indices of refraction, the members being inserted in the first and second holes,
    wherein distribution of index of refraction of the photonic crystal fiber preform is controlled by arrangement of the members, and said distribution of index of refraction of the photonic crystal fiber preform is changed by change of said arrangement of the members.

17. The preform as set forth in claim 16, wherein each of the members is formed in the shape of a rod, the rod being inserted in the corresponding hole.

18. The preform as set forth in claim 16, wherein each of said substrates has a respective diameter, and wherein each of the members is formed in the shape of a cylinder having a diameter smaller than that of the inner substrate if located within the inner substrate, and otherwise having a diameter smaller than the outer substrate diameter minus the inner substrate diameter.

* * * * *